United States Patent
Enomoto et al.

(10) Patent No.: US 7,438,521 B2
(45) Date of Patent: Oct. 21, 2008

(54) HYDRAULIC TURBINE AND STAY RING

(75) Inventors: Yasuyuki Enomoto, Chiba (JP);
Toshiaki Suzuki, Kanagawa (JP);
Kazuyuki Nakamura, Kanagawa (JP);
Taizo Inagaki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 201 days.

(21) Appl. No.: 11/482,074

(22) Filed: Jul. 7, 2006

(65) Prior Publication Data

US 2007/0020096 A1    Jan. 25, 2007

(30) Foreign Application Priority Data

Jul. 8, 2005    (JP)    .............................. 2005-199977

(51) Int. Cl.
*F03B 3/02*    (2006.01)
(52) U.S. Cl. ...................... 415/161; 415/205; 415/209.1
(58) Field of Classification Search .................. 415/161, 415/164, 186, 205
See application file for complete search history.

(56) References Cited

U.S. PATENT DOCUMENTS 4,218,182 A * 8/1980 Tsunoda et al. ............. 415/205

FOREIGN PATENT DOCUMENTS

JP    2000-297735    10/2000

* cited by examiner

*Primary Examiner*—Richard Edgar
(74) *Attorney, Agent, or Firm*—Finnegan, Henderson, Farabow, Garrett & Dunner, L.L.P.

(57) ABSTRACT

A stay ring of a hydraulic turbine has: a ring-shaped upper wall, a ring-shaped lower wall arranged below the upper wall forming a ring-shaped flow channel between the upper wall and the lower wall; and stay vanes arranged in array with spaces in a peripheral direction in the ring-shaped flow channel and rigidly secured to the upper and lower walls. The upper wall and the lower wall are inclined so as to reduce height of the ring-shaped flow channel toward outlet at least near inlet end thereof. The straightening bodies are arranged along inner surfaces of the upper wall and the lower wall at least near inlet end to reduce inclination of water flow in the stay ring.

16 Claims, 10 Drawing Sheets

HYDRAULIC TURBINE AND STAY RING

CROSS REFERENCE TO RELATED APPLICATION

The present invention contains subject matter related to Japanese Patent Application No. 2005-199977, filed in the Japanese Patent Office on Jul. 8, 2005, the entire content of which is incorporated herein by reference.

BACKGROUND OF THE INVENTION

This invention relates to a hydraulic turbine, which may be optionally a pump turbine, and a stay ring to be used in a hydraulic turbine.

A hydraulic turbine generally has a penstock, a spiral casing, a stay ring, a set of guide vanes, a runner, a draft tube and a generator. When the hydraulic turbine is in operation, water from an upper reservoir is guided by the penstock and its flow direction is shifted to a rotating direction by the spiral casing. Then, the water is guided to the runner by way of the stay ring that links the spiral casing and the guide vanes for controlling the flow rate. Thus, the potential energy of the water is converted into rotational energy before the water flows out to a lower reservoir by way of the draft tube. The rotational energy collected by the runner is then converted into electric power by the generator.

The stay ring is formed by ring-shaped upper and lower walls and stay vanes that link them. The stay vanes take the role of rectifying the flow of water from the spiral casing, and, at the same time, the role of strengthening members linking the upper and lower walls.

The profiles of stay rings that can be used in hydraulic turbines are largely classified into two types. One type is a bell-mouthed type where the height of the stay ring differs between the spiral casing side and the guide vane side, and the other is a parallel type where it does not differ. Conventionally, stay rings of the bell-mouthed type are popular, because the wall surface of the spiral casing and the wall surfaces of the upper and lower walls of the stay ring of that type are linked smoothly. As for a stay ring of the parallel type, there exists a part that runs in parallel with the outer peripheries of the stay vanes. Thus, the flow direction of water flowing from the spiral casing into the stay ring varies as a function of the peripheral position, but the flow angle of water is substantially the same in the elevating direction at a same peripheral position. Therefore, the loss of energy is small if the stay vanes have an inlet profile having an angle that is substantially the same as the flow angle.

However, a large number of hydraulic turbines, which were built decades ago and have bell-mouthed type stay rings, are still operating now. Many of the hydraulic turbines that were built decades ago have stay rings whose profiles are not appropriate, consequently giving rise to large energy loss at the stay rings. Since the stay ring of the bell-mouthed type has upper and lower wall inclined surfaces, water flows aslant relative to the central axis of the hydraulic turbine near the upper and lower wall surfaces. Therefore, the flow angles differ between the flow angle near the upper and lower wall surfaces and the flow angle near the center. Thus, if the stay vanes have a same profile in the elevating direction, there exists a part in each of the stay vanes where the flow angle of water flowing into the stay vane and the geometrical angle of the inlet of the stay vane vary from each other, which can give rise to energy loss at the inlet part. Stay vanes to be used in a stay ring of a hydraulic machine that have varying inlet profiles in the elevating direction are known in the art (See Japanese Patent Application Laid-Open Publication No. 2000-297735, the entire content of which being incorporated herein by reference).

As pointed out above, the stay vanes take the role of strengthening members. This means that, when existing stay vanes are to be modified, the strength thereof needs to be taken into consideration. In short, existing stay vanes should not be modified to a large extent particularly if they are to be renovated by cutting. However, if the rate at which the profile of the upper and lower wall surfaces of a stay ring of the bell-mouthed type changes is not appropriate, the flow angle can show significant variances in the elevating direction at the inlet parts of the stay vanes. Then, it may be difficult to make the modification of the stay vanes sufficiently effective, if the modification is made only at the inlet parts thereof.

SUMMARY OF THE INVENTION

In view of the above-identified problems, it is an object of the present invention to provide a stay ring that can be used to remodel a hydraulic turbine so as to make it operate highly efficiently and a hydraulic turbine having such a stay ring.

According to an aspect of the present invention, there is provided a hydraulic turbine comprising: a spiral casing; a stay ring disposed within the casing for changing flow direction from the casing; a plurality of guide vanes disposed within the stray ring, the guide vanes being arranged in array with spaces therebetween in circumferential direction, the guide vanes being adjustable in opening thereof; and a runner disposed within the guide vanes driven rotating by water guided by the guide vanes; wherein: the stay ring comprises: a ring-shaped upper wall; a ring-shaped lower wall arranged below the upper wall forming a ring-shaped flow channel between the upper wall and the lower wall; and a plurality of stay vanes arranged in array with spaces therebetween in a peripheral direction in the ring-shaped flow channel and rigidly secured to the upper and lower walls; wherein: the upper wall and the lower wall are inclined so as to reduce height of the ring-shaped flow channel toward outlet at least near inlet end thereof; and the straightening bodies are arranged along inner surfaces of the upper wall and the lower wall at least near inlet end to reduce inclination of water flow in the stay ring.

According to another aspect of the present invention, there is provided a stay ring of a hydraulic turbine, the stay ring having: a ring-shaped upper wall, a ring-shaped lower wall arranged below the upper wall forming a ring-shaped flow channel between the upper wall and the lower wall; and a plurality of stay vanes arranged in array with spaces therebetween in a peripheral direction in the ring-shaped flow channel and rigidly secured to the upper and lower walls, the stay ring being so adapted as to be arranged in inside of a spiral casing of a hydraulic turbine and to guide water flow from the casing to guide vanes arranged inner side of the stay ring; wherein: the upper wall and the lower wall are inclined so as to reduce height of the ring-shaped flow channel toward outlet at least near inlet end thereof; and straightening bodies are arranged along inner surfaces of the upper wall and the lower wall at least near inlet end to reduce inclination of water flow in the stay ring.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION OF THE INVENTION

Now, the present invention will be described in greater detail by referring to the accompanying drawings that illustrate preferred embodiments of hydraulic turbines and stay rings according to the present invention.

Figure 13:
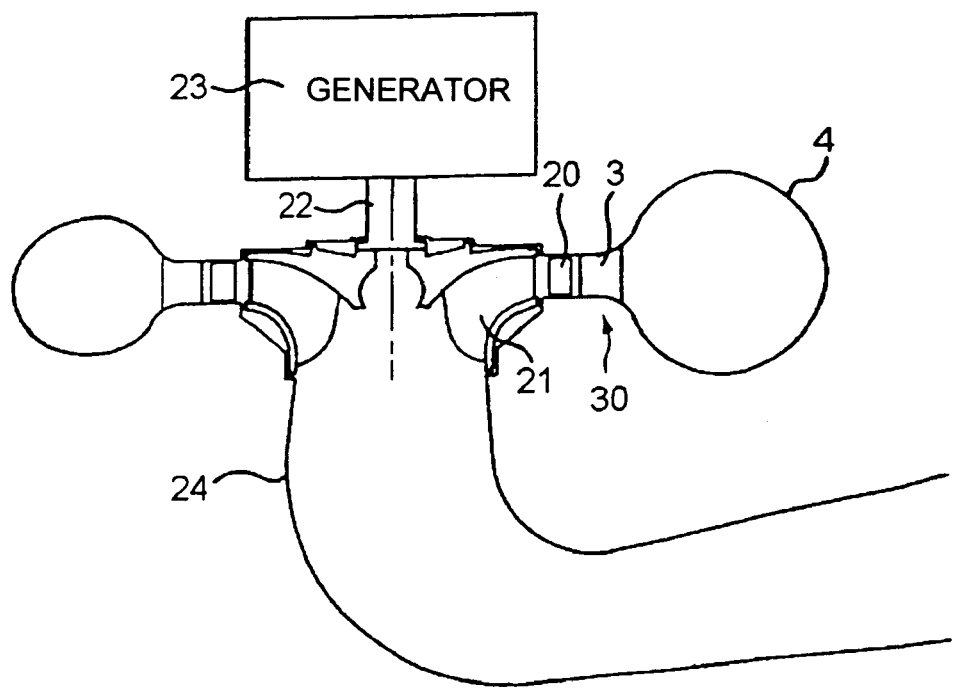
FIG. 13 is a schematic elevational cross sectional view of an embodiment of a hydraulic turbine according to the present invention.

FIG. 13 is an elevational cross sectional view of an embodiment of a hydraulic turbine according to the present invention. The hydraulic turbine is a Francis turbine and has a spiral casing 4, a set of stay vanes 3 arranged within the spiral casing 4, a set of guide vanes 20 arranged within the stay vanes 3, and a runner 21 arranged at the center. The runner 21 is arranged to be rotated about a vertical rotational axis by the water flow. The runner 21 is connected to a main shaft 22, and the main shaft 22 is connected to a generator 23. The generator 23 is driven by the runner 21 and generates electric power. The water from the runner 21 is guided to a draft tube 24.

This hydraulic machine may be operated both as a hydraulic turbine and as a pump. However, the explanation here is only about the situation where this machine is operated as a hydraulic turbine. When the hydraulic turbine is in operation, water from an upper reservoir (not shown) is guided by the penstock (not shown) and its flow direction is shifted to a rotating direction by the spiral casing 4. Then, the water from the spiral casing 4 is guided to the runner 21 by way of the stay vanes 3 and the guide vanes 20. Thus, the potential energy of the water is converted into rotational energy before the water flows out to a lower reservoir by way of the draft tube 24. The rotational energy collected by the runner 21 is then converted into electric power by the generator 23. The openings of the guide vanes 20 are adjusted for controlling the flow rate and for controlling the electric power generation rate.

Figure 1:
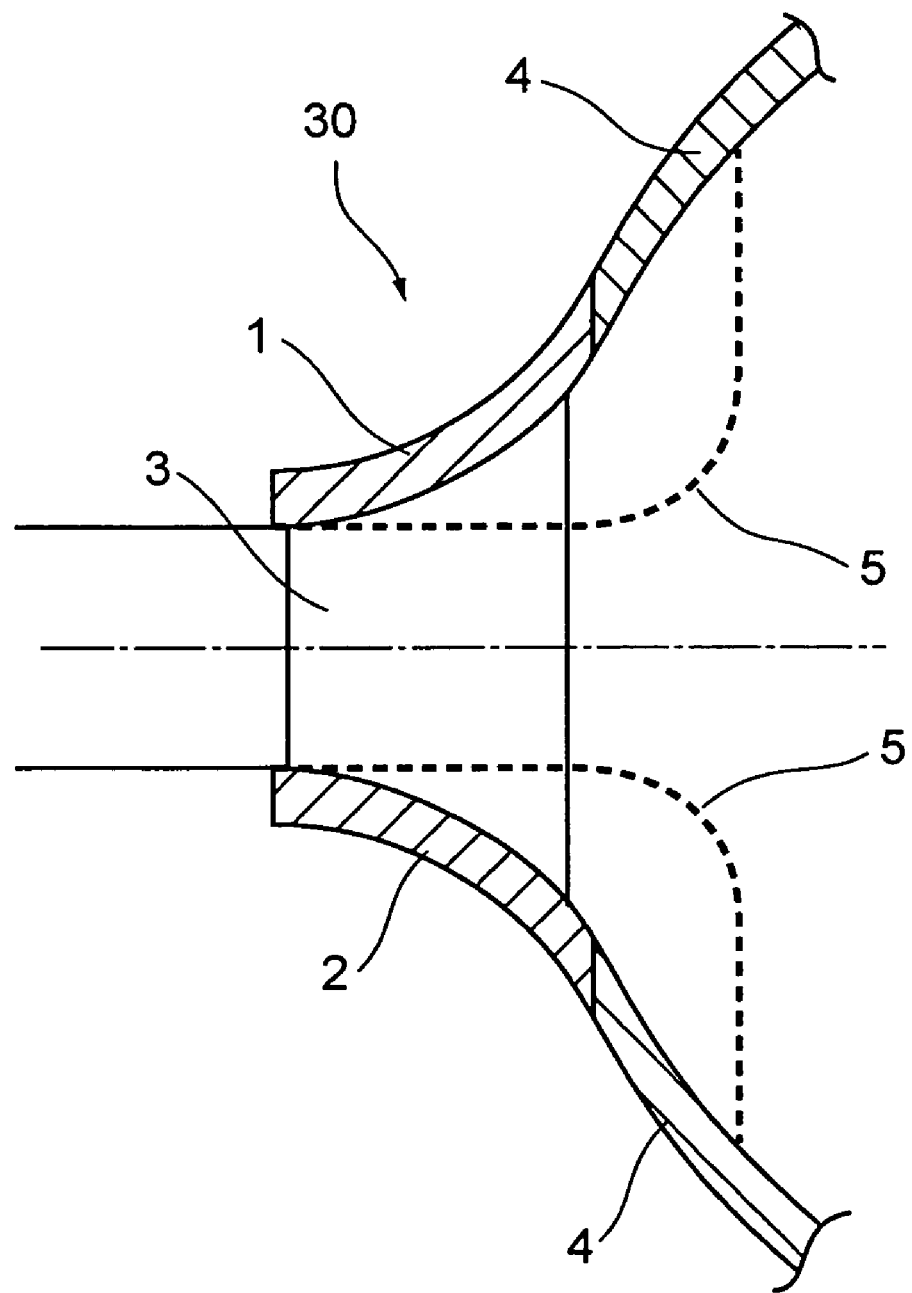
FIG. 1 is a schematic elevational cross sectional view of an embodiment of a stay ring according to the present invention, showing the right half and its vicinity.

FIG. 1 is a schematic elevational cross sectional view of an embodiment of a stay ring 30 according to the present invention, showing the right half and its vicinity. The stay ring 30 is that of the bell-mouthed type.

The stay ring 30 has the stay vanes 3 described above, an upper wall 1 and a lower wall. Straightening plates (straightening bodies) 5 are fitted into the stay ring 30 from the spiral casing 4. The water is fed leftward in FIG. 1 from the spiral casing 4 to the runner 21 by way of the stay ring 30 and the guide vanes 20.

The upper wall 1 and the lower wall 2 have respective ring-shaped profiles that are symmetric in the vertical direction. They are formed in such a way that the upper wall 1 and the lower wall 2 are inclined respectively downwardly and upwardly toward the central axis of the hydraulic turbine so that the flow channel is narrowed in the vertical direction toward the downstream in terms of hydraulic turbine operation. A plurality of stay vanes 3 are arranged in an array substantially at regular intervals in the peripheral direction between the upper wall 1 and the lower wall 2.

The straightening plates 5 are arranged respectively below the upper wall 1 and above the lower wall 2 to vertically narrow the flow channel before the flow of water from the spiral casing 4 enters the stay ring 30 (and hence at the upstream side of the stay ring 30) in order to make the flow of water in the stay ring 30 substantially horizontal. Because the straightening plates 5 are arranged to rectify the flow direction of water in the inside thereof, the gap between the upper wall 1 and the upper straightening plate 5 and the gap between the lower wall 2 and the lower straightening plate 5 may be made stagnant zones, and hence the straightening plates 5 may be replaced by block-shaped straightening bodies in order to eliminate water from those zones.

In the embodiment having the above-described configuration, the velocity component in the elevating direction is reduced in the flow channels between the stay vanes 3 by the straightening plates 5 if compared with an arrangement where no straightening plates are provided.

Figure 2A:
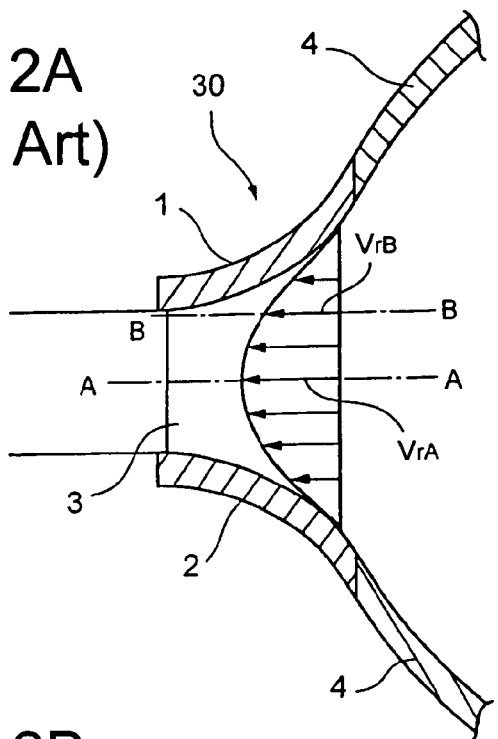
FIG. 2A is a schematic elevational cross sectional view of a conventional stay ring of the bell-mouthed type, showing the distribution of velocity components of the flow of water in a radial direction near the stay ring.
Figure 2B:
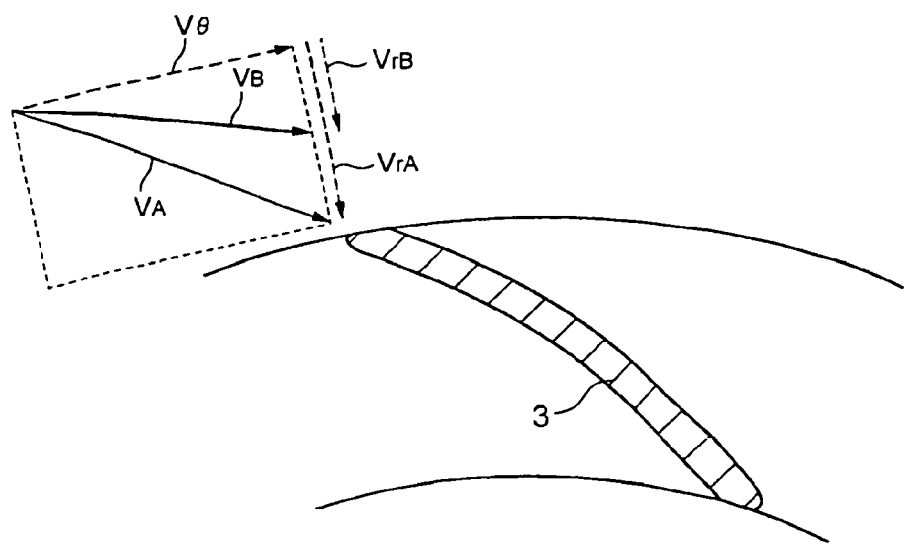
FIG. 2B is a schematic illustration of the velocity of the flow of water at the inlet of the stay ring of FIG. 2A.

FIG. 2A is a schematic elevational cross sectional view of a conventional stay ring 30 of the bell-mouthed type, showing the vertical distribution of velocity components of the flow of water in a radial direction near the stay ring 30. FIG. 2B is a schematic illustration of the flows of water in two cross sections of the conventional stay ring 30 shown in FIG. 2A, one at the center of the hydraulic turbine and the other near the wall surface thereof. In FIGS. 2A and 2B, Vr denotes the velocity in a radial direction and Vθ denotes the velocity in a peripheral direction, while V denotes the absolute velocity and the suffixes A and B indicate that the related velocities in the radial direction are observed respectively at cross section A-A and at cross section B-B.

As shown in FIG. 2A, the radial velocity of the flow of water in a stay ring 30 of the bell-mouthed type is smaller along the wall surface than at the center. However, the peripheral velocity of the flow of water does not practically vary in the elevating direction. Thus, as shown in FIG. 2B, when the flow of water is observed at the inlet of a stay vane along the cross section A-A at the center line of the hydraulic turbine and along the cross section B-B near the wall surface, it will be understood that the inflow angle is smaller near the wall surface (cross section B-B) than along the center line of the hydraulic turbine (cross section A-A). Because of this phenomenon, there arises a collision loss at the inlets of the stay vanes when the inlet angles of the stay vanes 3 are same in the elevating direction. Additionally, when curvature of the wall surface of the stay ring 30 is not appropriate, energy loss can be produced at the stay vanes 3 by the velocity component in the elevating direction due to a secondary flow.

Figure 3A:
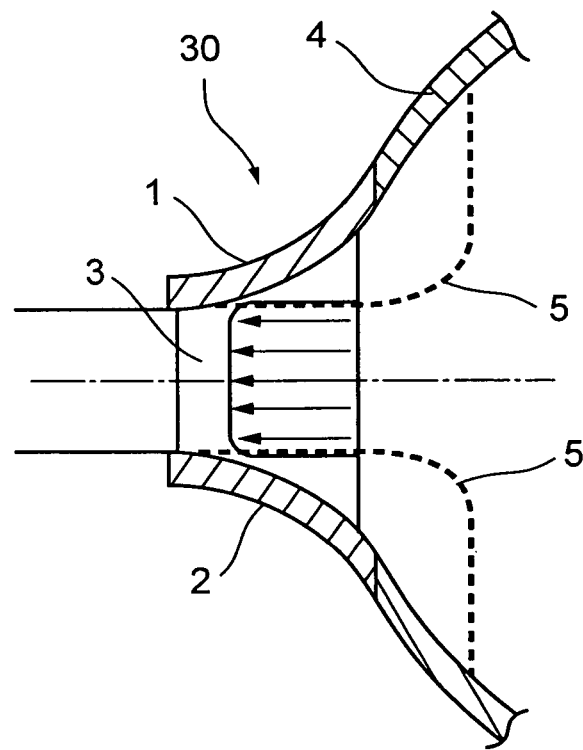
FIG. 3A is a schematic elevational cross sectional view of an embodiment of a stay ring according to the present invention, showing the distribution of velocity components of the flow of water in a radial direction near the stay ring.
Figure 3B:
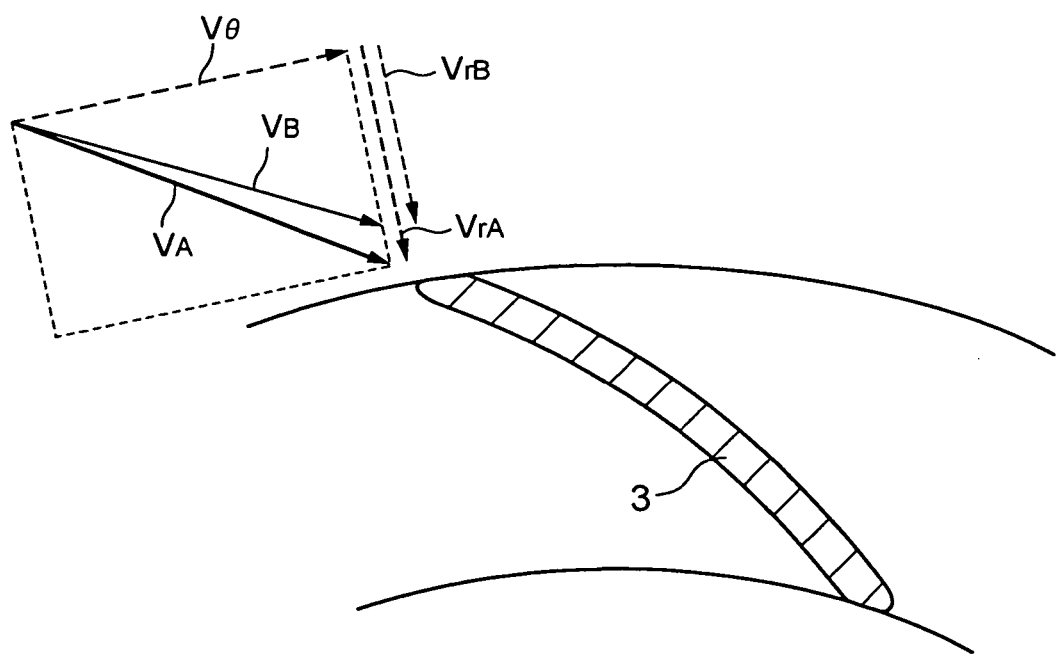
FIG. 3B is a schematic illustration of the velocity of the flow of water at the inlet of the stay ring of FIG. 3A.

When, on the other hand, a straightening plates 5 are provided, the radial velocity of the flow of water relative to the elevating direction of the stay vanes 3 changes only at a small rate as shown in FIG. 3A and the flow of water entering the stay vanes 3 does not practically change in the elevating direction as seen from FIG. 3B. Thus, the collision loss at the inlets of the stay vanes 3 is reduced when the geometrical angle of the inlet of each stay vane 3 and the flow angle are close to each other.

Additionally, as the velocity component in the elevating direction is reduced, the loss due to secondary flow at the downstream of the stay vanes 3 is also reduced. Many hydraulic turbines that were installed decades ago are so designed that the angle of the inlet of each stay vane 3 is larger than the flow angle. Then, if the width of the flow channel of the stay ring 30 is reduced as in this embodiment, the radial velocity component is increased, which would increase the flow angle. Therefore, the collision loss at the inlets of the stay vanes 3 can be reduced without modifying the profiles of the inlets of the stay vanes 3. Thus, with this embodiment, it is possible to significantly improve the efficiency of hydraulic turbines that has conventional bell-mouthed type stay rings 30.

Figure 4A:
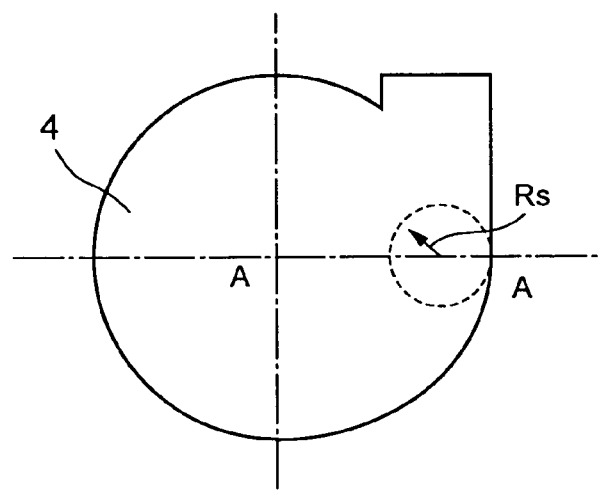
FIG. 4A is a schematic plan view of an embodiment of a hydraulic turbine according to the present invention.

Now, the embodiment of hydraulic turbine will be described in greater detail by referring to FIGS. 4A and 4B. FIG. 4A is a schematic plan view of the spiral casing 4, and FIG. 4B is a schematic elevational cross sectional view of the stay ring 30 and its vicinity of FIG. 4A taken along line A-A.

Figure 4B:
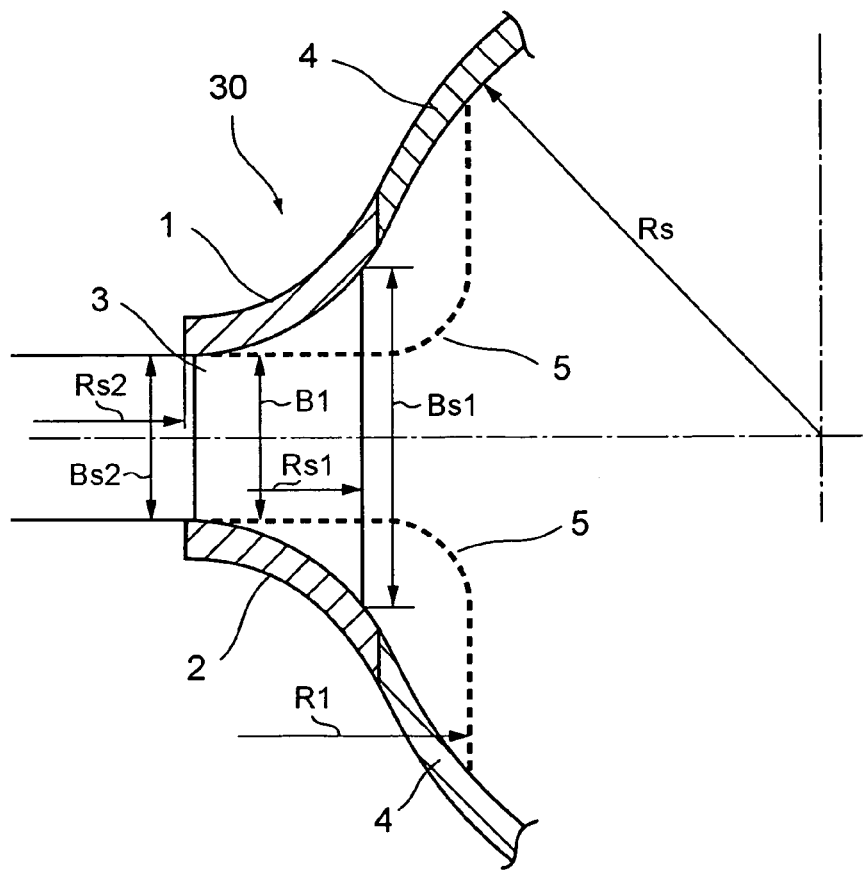
FIG. 4B is a schematic elevational cross sectional view of the stay ring of FIG. 4A, showing the right half and its vicinity.

Referring to FIGS. 4A and 4B, R1 is the outermost radius of the straightening plates 5, B1 is the smallest height of the straightening plates, Rs1 is the outer radius of the inlet of the stay vanes, Bs2 is the smallest height of the stay ring 30 at the outlet, and Rs is the radius of curvature of the initial volute part (inner part) of the spiral casing 4. The straightening plates 5 are arranged within a range defined by formulas $$B1 \geq Bs2 \tag{1}$$

and $$R1 - Rs1 \leq 0.2 \times Rs \tag{2}$$

When the outermost boundaries of the straightening plates 5 are arranged excessively in the inside of the spiral casing 4, the flow rate in the spiral casing 4 rises to increase the loss of energy in the spiral casing 4. Additionally, if straightening plates 5 were arranged to reduce the height of the flow channel there than at the outlet of the stay vanes 3, the flow channel directed in the elevating direction formed by the stay ring 30 would expand at the downstream side. In such a case, an additional loss of energy would arise. Therefore, when straightening plates 5 are fitted to the bell-mouthed type stay ring 30 to reduce the loss of energy that can arise at the stay ring 30, it is desirable to install them in the range defined by the above formulas (1) and (2).

More preferably, the straightening plates 5 are made to show a profile that satisfies the requirement of formula $$0.05 \times Rs \leq R1 - Rs1 \leq 0.2 \times Rs \tag{3}$$

Figure 5:
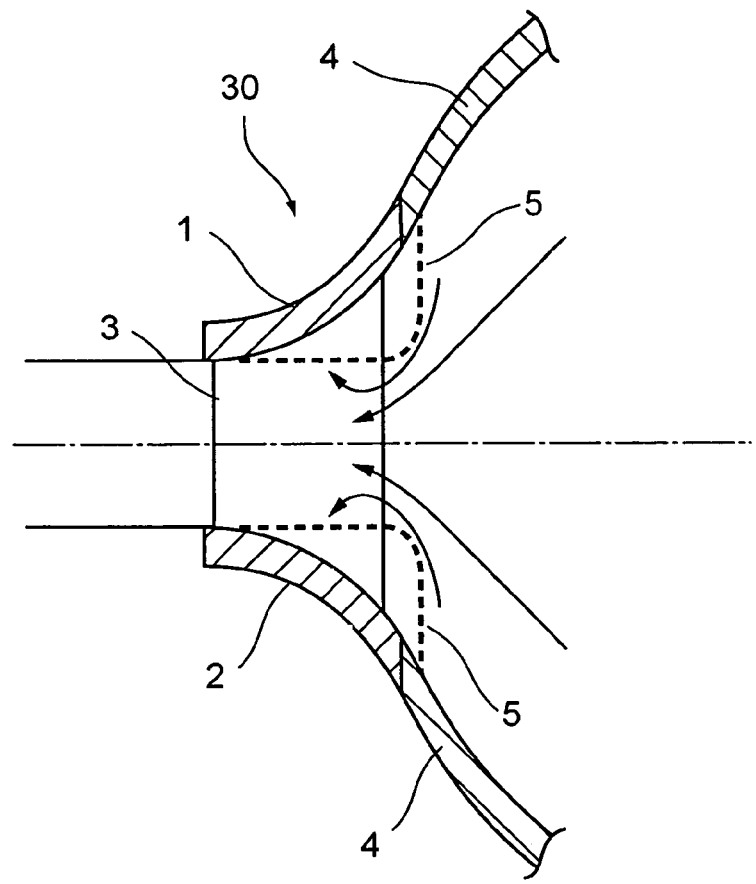
FIG. 5 is a schematic cross sectional view of an embodiment of a stay ring according to the present invention, showing the right half and its vicinity to illustrate the effect of the embodiment.

When straightening plates 5 are fitted to the bell-mouthed type stay ring 30, the flow of water that is bent at the corners of the straightening plates 5 can influence the downstream thereof down to the inlets of the stay vanes 3 as shown in FIG. 5. However, the influence of the flow bent at the corners of the straightening plates 5 is reduced at the inlets of the stay vanes 3 when the profile of the straightening plates 5 satisfies the requirement of the formula (3) above. On the other hand, if the profile of the straightening plates 5 does not satisfy the requirement of the formula (3) above, the cross sectional area of the spiral casing 4 is excessively reduced to raise the velocity of the flow of water in the spiral casing 4 and also the frictional loss in the spiral casing 4.

Figure 6:
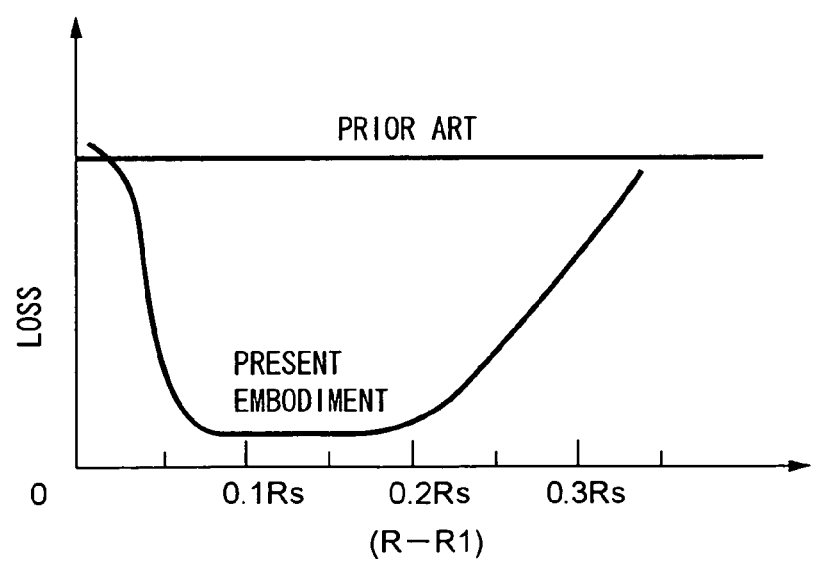
FIG. 6 is a graph illustrating the loss of energy and the effect of an embodiment of the present invention.

FIG. 6 shows a graph obtained by analytically determining the ratio of the loss in the stay ring 30 to the loss in the spiral casing 4 by varying the radius of the straightening plates 5. It will be understood from FIG. 6 that the spiral casing 4 and the straightening plates 5 are well balanced to reduce the loss of energy when the profile of the straightening plates 5 satisfies the requirement of the formula (3) above. When the straightening plates 5 are too large, the material cost and the cost for modifying them can be excessively high. Thus, it is possible to remarkably improve the efficiency and suppress the cost of a hydraulic turbine having a bell-mouthed type stay ring 30 by means of an arrangement that satisfies the requirement of the formula (3) above.

In the above described arrangement, it is further preferable to make it satisfies the requirement defined by formula (4) below.

$$0 \leq (B1 - Bs2)/(Bs1 - Bs2) \leq 0.3 \tag{4}$$

The angles of the stay vanes 3 relative to the bell-mouthed type stay ring 30 at the inlets thereof become uniform in the elevating direction to make it possible to reduce the collision loss at the inlets of the stay vanes 3 when straightening plates 5 are fitted to the bell-mouthed type stay ring 30. However, when straightening plates 5 are fitted to the bell-mouthed type stay ring 30 with an excessively large height relative to the parallel part of the stay ring 30 at the outlets of the stay vanes 3, the flow of water can become unstable in the area where the straightening plates 5 are linked to the upper wall 1 and the lower wall 2. In such a case, a large loss of energy arises, although the collision loss at the inlets of the stay vanes 3 may be reduced.

Figure 7:
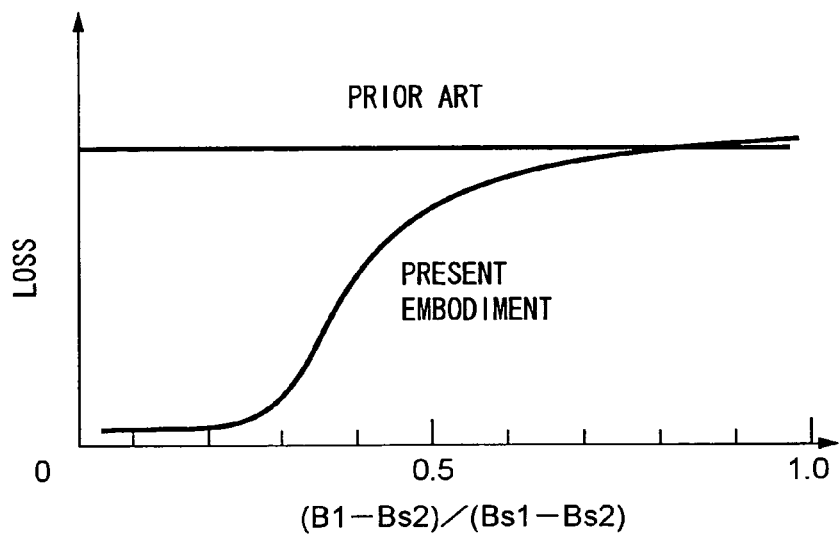
FIG. 7 is a graph illustrating the loss of energy and the effect of an embodiment of the present invention.

FIG. 7 shows a graph obtained by analytically determining the loss of energy in the stay ring 30 as a function of the positions where the straightening plates 5 are fitted to the stay ring 30. From the graph of FIG. 7, it will be understood that the loss is reduced in the range defined by the formula (4) above. Thus, the efficiency of operation of a hydraulic turbine of the type under consideration can be maximized by means of an arrangement that satisfies the requirement of the formula (4) above.

Figure 8:
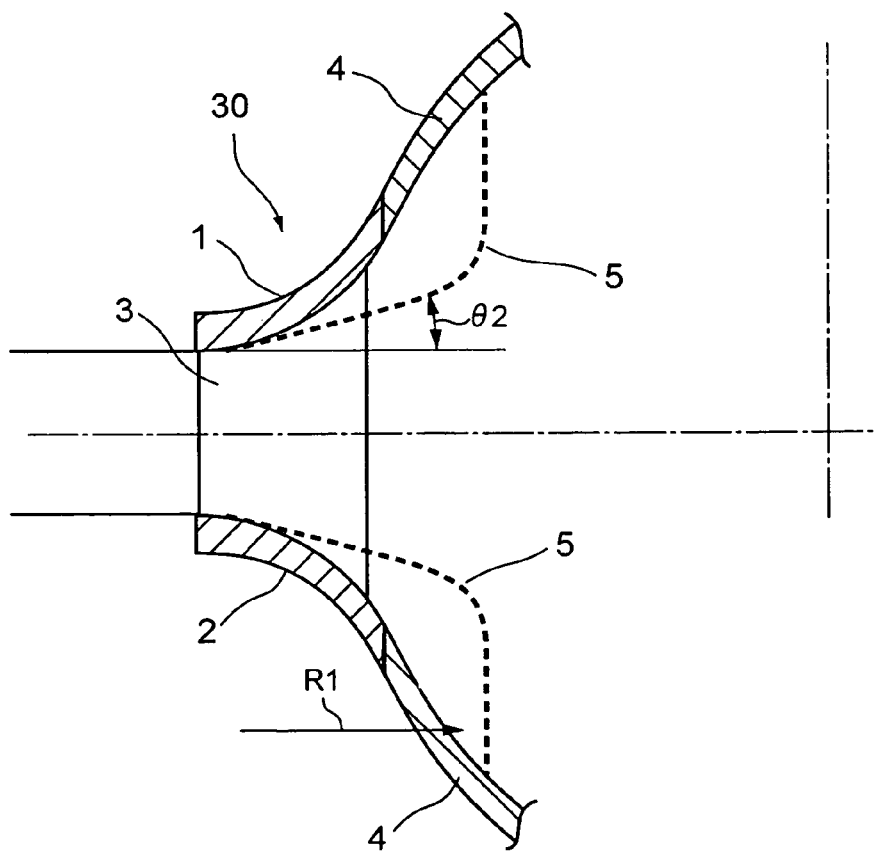
FIG. 8 is a schematic cross sectional view of an embodiment of a stay ring according to the present invention, showing the right half and its vicinity.

Referring now to FIG. 8, an angle θ2 of arrangement of the straightening plates 5 at the outlet is defined in such a way that: the angle θ2 is 0° when the straightening plates 5 are parallel with the cross section of the center of the hydraulic turbine at the outlet where the bell-mouthed type stay ring 30 and the straightening plates 5 are connected to each other; and the angle θ2 is positive when the flow channel contracts toward the outlet. The straightening plates 5 are preferably arranged in such a way that the angle θ2 satisfies the requirement of formula (5) shown below.

$$0° \leq θ2 \leq 20° \tag{5}$$

If the angle of inclination of the straightening plates 5 near the stay vanes 3 is excessively large when the straightening plates 5 are fitted to the bell-mouthed type stay ring 30, a velocity component is produced in the elevating direction between the stay vanes 3. If the velocity component in the elevating direction is large, loss of energy can be produced at the stay vanes 3 under the influence of the flow.

Figure 9:
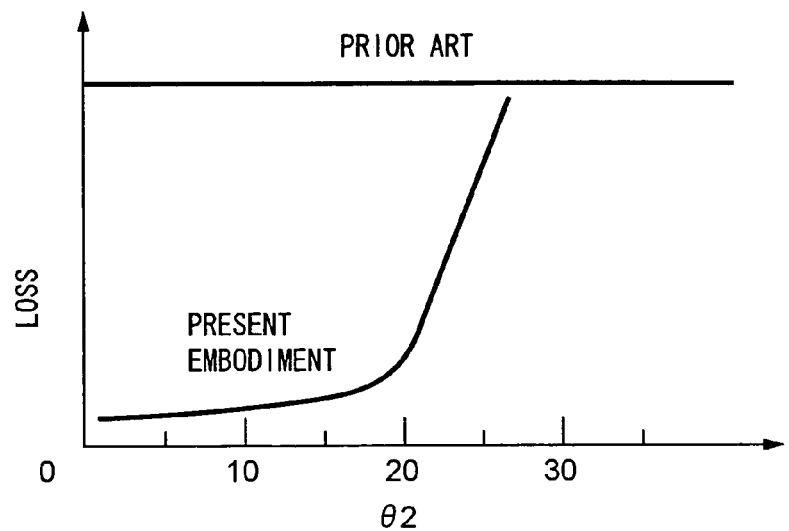
FIG. 9 is a graph illustrating the loss of energy and the effect of an embodiment of the present invention.

FIG. 9 shows a graph obtained by analytically determining the loss of energy in a bell-mouthed type stay ring 30 by changing the angle θ2 of arrangement of the straightening plates 5 that are fitted to the stay ring 30. It will be understood from FIG. 9 that the loss is minimized when the straightening plates 5 are so arranged as to produce a parallel flow channel (θ2=0°) and increases as θ2 is increased. The loss increases abruptly when θ2 exceeds 20°. Thus, it will be understood that the angle θ2 of arrangement of straightening plates 5 can find an appropriate value and the effect of straightening plates 5 can be improved by arranging them at an angle between 0 and 20°.

Figure 10:
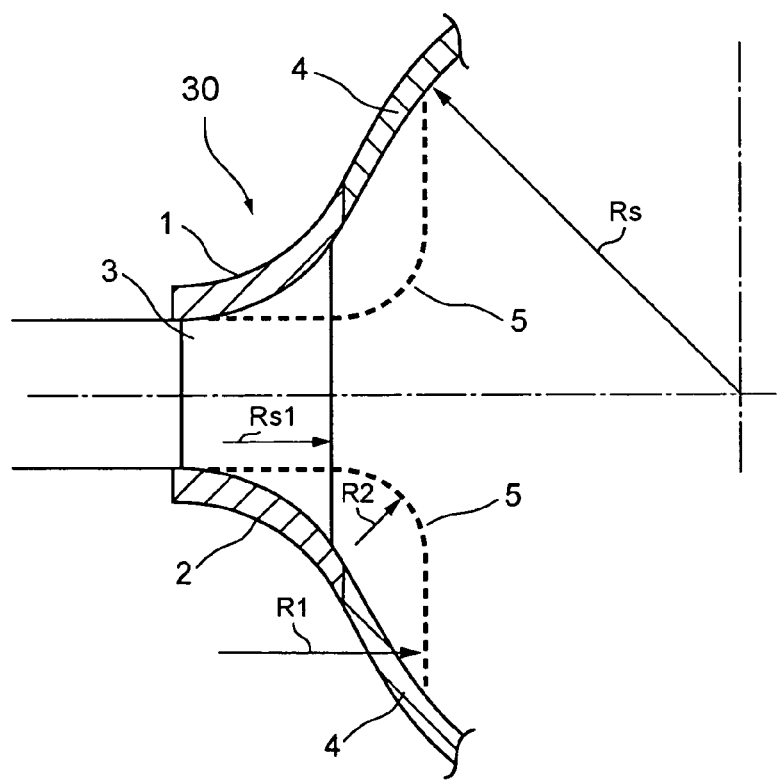
FIG. 10 is a schematic cross sectional view of an embodiment of a stay ring according to the present invention, showing the right half and its vicinity.

Now, as shown in FIG. 10, R2 is the radius of curvature of the corners of the straightening plates 5 at the inlet. It is preferable to form the straightening plates 5 so as to make R2 satisfies the requirement of formula (6) below.

$$0.05 \times Rs \leq R2 \leq R1 - Rs1 \tag{6}$$

Figure 11:
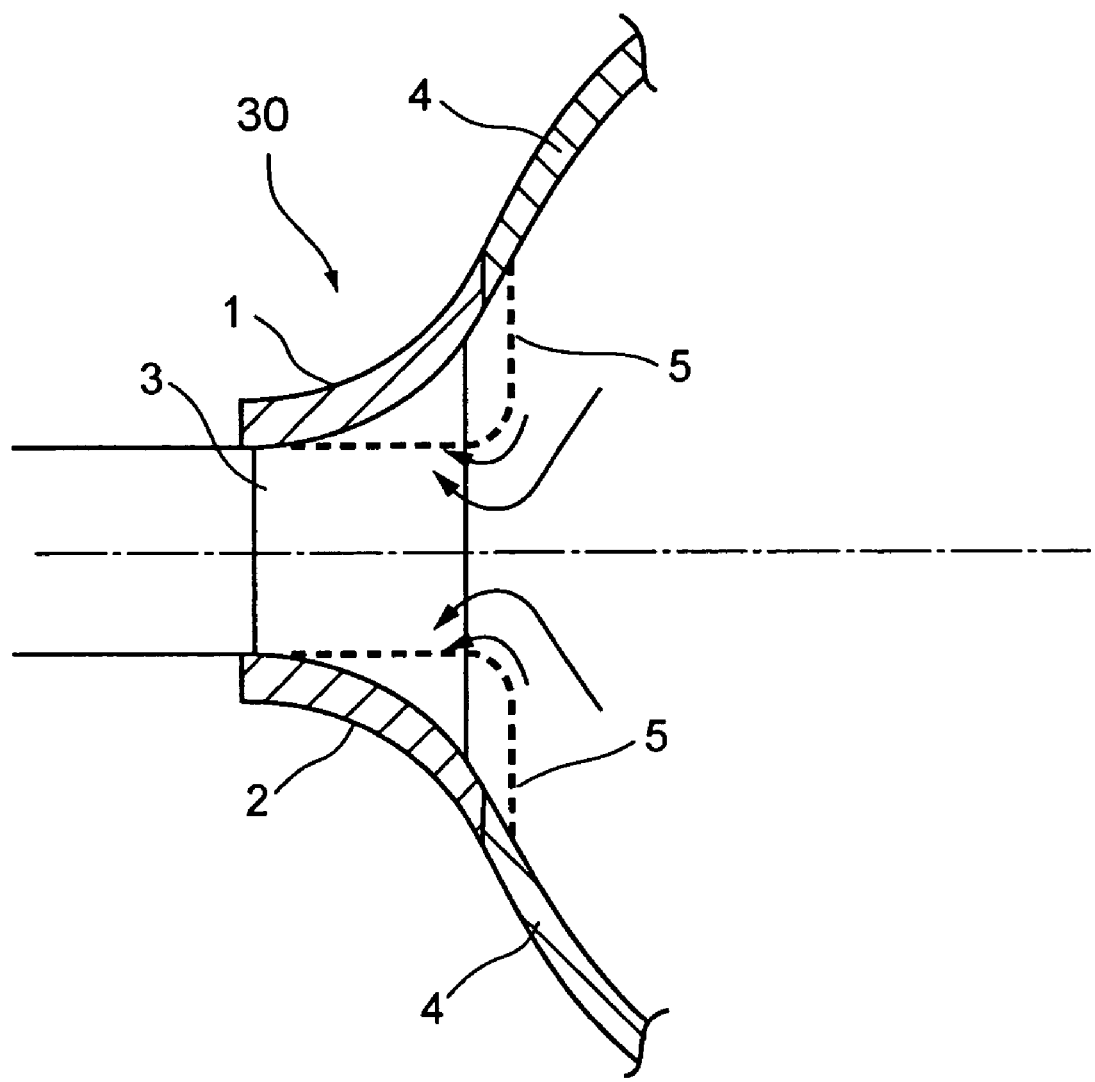
FIG. 11 is a schematic cross sectional view of an embodiment of a stay ring according to the present invention, showing the right half and its vicinity to illustrate the effect of the embodiment.

Water coming from the spiral casing 4 is influenced to a large extent by the profile of the straightening plats 5 near the wall surface. Particularly, the flow of water is curved at the corners of the straightening plates 5, and hence, flow separation can take place as shown in FIG. 11, if the radius of curvature of the corners is small. However, if the radius of curvature R2 of the corners of the straightening plates 5 is not less than 0.05×Rs, flow separation is suppressed, and the flow separation, if any, has little influence on the inlets of the stay vanes 3.

Figure 12:
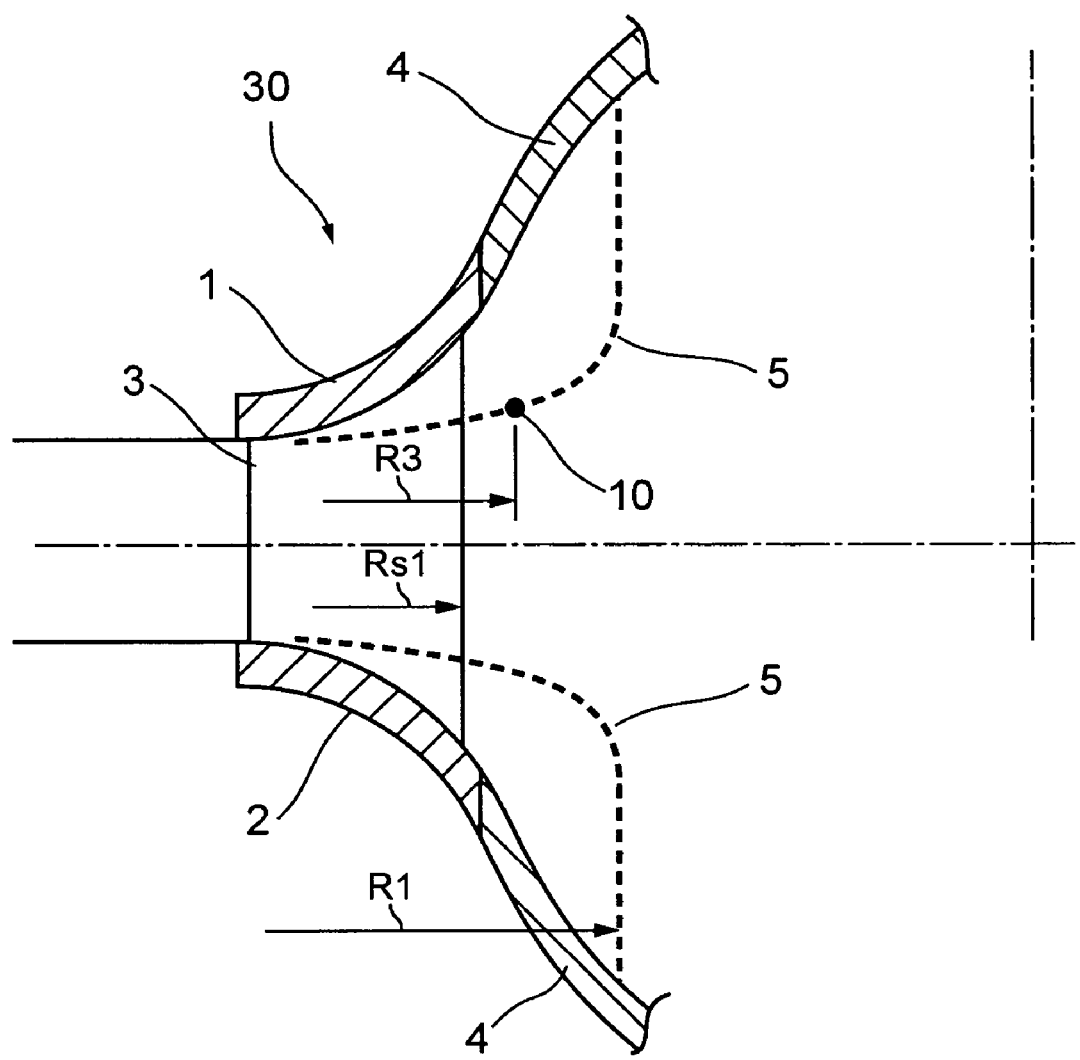
FIG. 12 is a schematic cross sectional view of an embodiment of a stay ring according to the present invention, showing the right half and its vicinity.

The profile in the meridian plane (profile of a vertical cross section) of each of the straightening plates 5 fitted to a bell-mouthed type stay ring 30 may have one or more than one points where the curvature changes as shown in FIG. 12. R3 is the radius at the point 10 located closest to the outlet where the curvature changes. It is preferable that the requirement of formula (7) shown below is satisfied.

$$Rs1 \leq R3 \tag{7}$$

As described above in detail, loss of energy is apt to arise at the stay vanes 3 of a stay ring 30 when vertical velocity component exists there, and such vertical velocity component is preferably minimized. When the profile in the meridian plane of each of the straightening plates 5 shows curvature or a straight line in the region of the stay vanes 3, vertical velocity component is apt to appear at any point in the region of the stay vanes 3 where the curvature changes to consequently give rise to loss of energy, provided that such a point exists. Therefore, the efficiency of a hydraulic turbine can be improved by selecting a profile for the straightening plates 5 that has points 10 where the curvature changes outside of the stay vanes 3 in the spiral casing 4.

The embodiments in accordance with the present invention explained above are merely samples, and the present invention is not restricted thereto. It is, therefore, to be understood that, within the scope of the appended claims, the present invention can be practiced in a manner other than as specifically described herein.

What is claimed is:

1. A hydraulic turbine, comprising:
 a spiral casing;
 a stay ring disposed within the spiral casing for changing a flow direction from the spiral casing;
 a plurality of adjustable guide vanes disposed within the stay ring, the guide vanes being arranged in an array with spaces therebetween in a circumferential direction thereof; and
 a runner disposed within the guide vanes rotated by water guided by the guide vanes;
 wherein the stay ring includes a ring-shaped upper wall, a ring-shaped lower wall arranged below the upper wall, and a plurality of stay vanes, the upper wall and the lower wall forming a ring-shaped flow channel therebetween, and the plurality of stay vanes being arranged in an array with spaces therebetween in a peripheral direction in the ring-shaped flow channel and being rigidly secured to the upper and lower walls,
 wherein the upper wall and the lower wall are inclined at least near an inlet end to reduce a height of the ring-shaped flow channel toward an outlet end thereof, and
 wherein straightening bodies are arranged at least near the inlet end, below the upper wall and above the lower wall to reduce inclination of water flow in the stay ring.

2. The hydraulic turbine according to claim 1, wherein formulas:

$$B1 \geq Bs2$$

and $$R1 - Rs1 \leq 0.2 \times Rs$$

are satisfied,
 where R1 is an outermost radius of the straightening bodies, B1 is a smallest height of the straightening bodies, Rs1 is an outer radius of the inlets of the stay vanes, Bs2 is a smallest height of the stay ring at the outlet end, and Rs is a radius of curvature at an initial volute part of the spiral casing.

3. The hydraulic turbine according to claim 2, wherein a formula $$0.05 \times Rs \leq R1 - Rs1$$

is additionally satisfied.

4. The hydraulic turbine according to claim 2, wherein a formula $$(B1 - Bs2)/(Bs1 - Bs2) \leq 0.3$$

is additionally satisfied, where Bs1 is a largest height of the stay ring at the inlet end.

5. The hydraulic turbine according to claim 2, wherein angles of inclination of the straightening bodies are not larger than 20° at outlets thereof.

6. The hydraulic turbine according to claim 2, wherein a formula $$0.05 \times Rs \leq R2 \leq R1 - Rs1$$

is additionally satisfied, and
 wherein the straightening bodies have corners where inclinations thereof change at an upstream side, and R2 is a radius of curvature of the corners.

7. The hydraulic turbine according to claim 2, wherein a formula $$Rs1 \leq R3$$

is additionally satisfied, and
 wherein a profile of the straightening bodies in a vertical cross section has at least one point where a curvature thereof changes, and R3 is a radius at the point located closest to the outlet where the curvature changes.

8. A stay ring of a hydraulic turbine, the stay ring comprising:
   a ring-shaped upper wall;
   a ring-shaped lower wall arranged below the upper wall, the upper wall and the lower wall forming a ring-shaped flow channel therebetween; and
   a plurality of stay vanes arranged in an array with spaces therebetween in a peripheral direction in the ring-shaped flow channel and being rigidly secured to the upper and lower walls,
   wherein the stay ring is arranged inside a spiral casing of the hydraulic turbine and guides water flow from the spiral casing to guide vanes arranged in an inner side of the stay ring,
   wherein the upper wall and the lower wall are inclined at least near an inlet end to reduce a height of the ring-shaped flow channel toward an outlet end thereof, and
   wherein straightening bodies are arranged at least near the inlet end, below the upper wall and above the lower wall to reduce inclination of water flow in the stay ring.

9. The stay ring according to claim 8, wherein formulas:

$$B1 \geq Bs2$$

and $$R1 - Rs1 \leq 0.2 \times Rs$$

are satisfied,
where R1 is an outermost radius of the straightening bodies, B1 is a smallest height of the straightening bodies, Rs1 is an outer radius of the inlets of the stay vanes, Bs2 is a smallest height of the stay ring at the outlet end, and Rs is a radius of curvature at an initial volute part of the spiral casing.

10. The stay ring according to clam 9, wherein a formula $$0.05 \times Rs \leq R1 - Rs1$$

is additionally satisfied.

11. The stay ring according to claim 9, wherein a formula $$(B1 - Bs2)/(Bs1 - Bs2) \leq 0.3$$

is additionally satisfied, where Bs1 is a largest height of the stay ring at the inlet end.

12. The stay ring according to claim 9, wherein angles of inclination of the straightening bodies are not larger than 20° at outlets thereof.

13. The stay ring according to claim 9, wherein a formula $$0.05 \times Rs \leq R2 \leq R1 - Rs1$$

is additionally satisfied, and
wherein the straightening bodies have corners where inclinations thereof change at an upstream side, and R2 is a radius of curvature of the corners.

14. The stay ring according to claim 9, wherein a formula $$Rs1 \leq R3$$

is additionally satisfied, and
wherein a profile of the straightening bodies in a vertical cross section has at least one point where a curvature thereof changes, and R3 is a radius at the point located closest to the outlet where the curvature changes.

15. A method of remodeling a hydraulic turbine, the method comprising:
   (i) providing a constructed hydraulic turbine, the constructed hydraulic turbine having:
      a spiral casing;
      a stay ring disposed within the spiral casing for changing a flow direction from the spiral casing;
      a plurality of adjustable guide vanes disposed within the stay ring, the guide vanes being arranged in an array with spaces therebetween in a circumferential direction thereof; and
      a runner disposed within the guide vanes rotated by water guided by the guide vanes;
      wherein the stay ring includes a ring-shaped upper wall, a ring shaped lower wall arranged below the upper wall, and a plurality of stay vanes, the upper wall and the lower wall forming a ring-shaped flow channel therebetween, and the plurality of stay vanes being arranged in an array with spaces therebetween in a peripheral direction in the ring-shaped flow channel and being rigidly secured to the upper and lower walls, and
   wherein the upper wall and the lower wall are inclined at least near an inlet end to reduce a height of the ring-shaped flow channel toward an outlet end thereof; and
   (ii) arranging straightening bodies at least near the inlet end, below the upper wall and above the lower wall to reduce inclination of water flow in the stay ring.

16. The method according to claim 15, wherein formulas:

$$B1 \geq Bs2$$

and $$R1 - Rs1 \leq 0.2 \times Rs$$

are satisfied,
where R1 is an outermost radius of the straightening bodies, B1 is a smallest height of the straightening bodies, Rs1 is an outer radius of the inlets of the stay vanes, Bs2 is a smallest height of the stay ring at the outlet end, and Rs is a radius of curvature at an initial volute part of the spiral casing.

* * * * *